J. P. O'DONOHUE.
TELEGRAPHIC TAPE PERFORATING APPARATUS.
APPLICATION FILED DEC. 4, 1911.
1,050,163.
Patented Jan. 14, 1913.
3 SHEETS—SHEET 1.
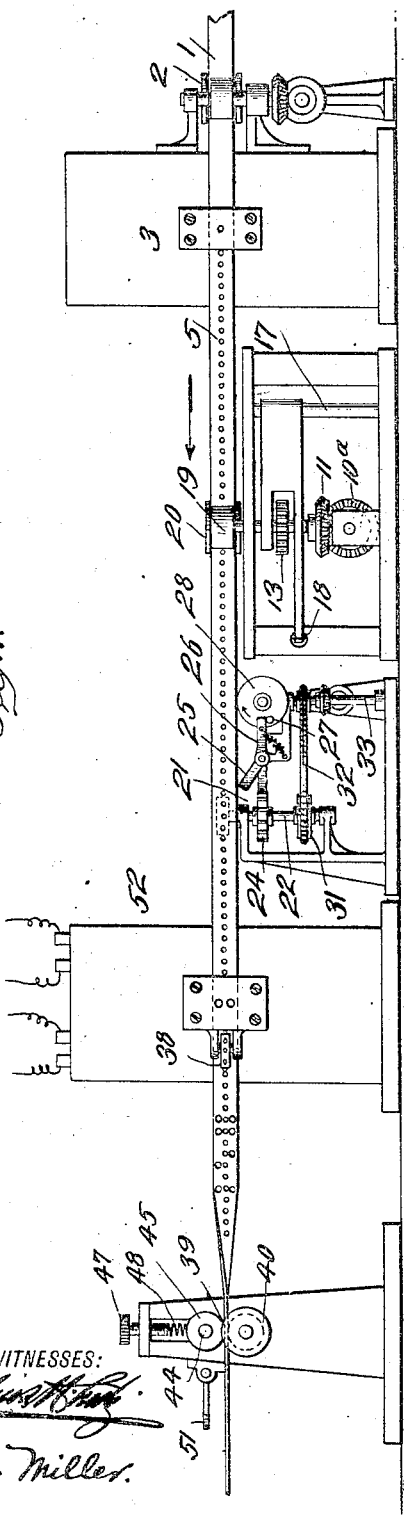
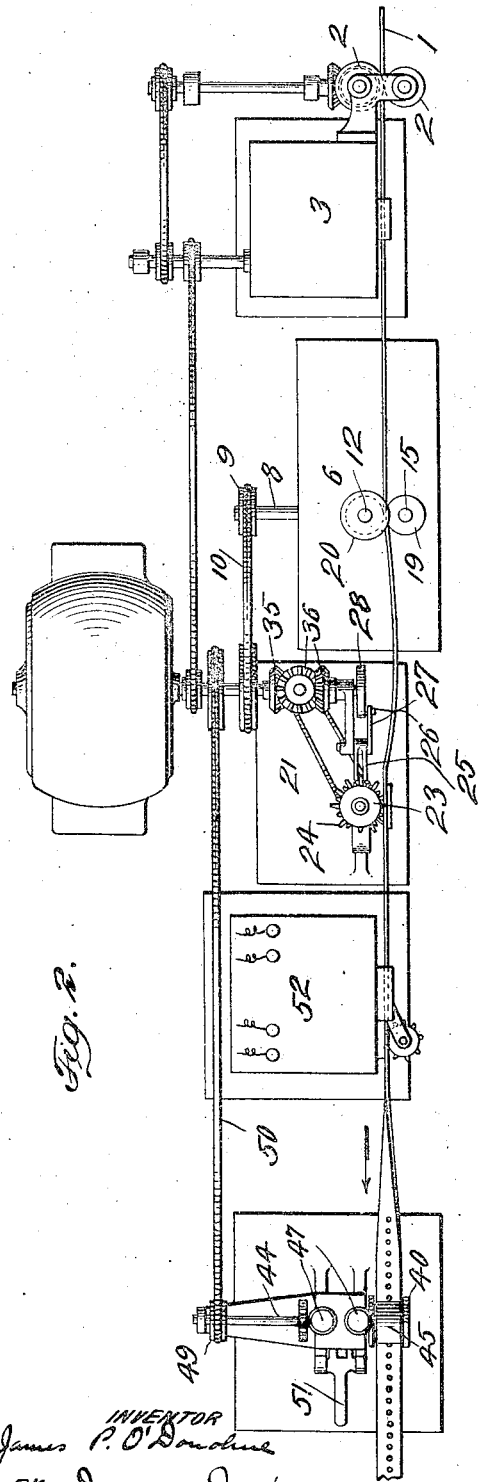

J. P. O'DONOHUE.
TELEGRAPHIC TAPE PERFORATING APPARATUS.
APPLICATION FILED DEC. 4, 1911.
1,050,163.
Patented Jan. 14, 1913.
3 SHEETS—SHEET 2.
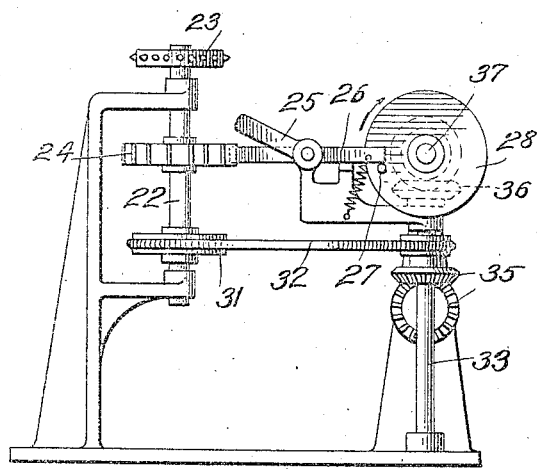
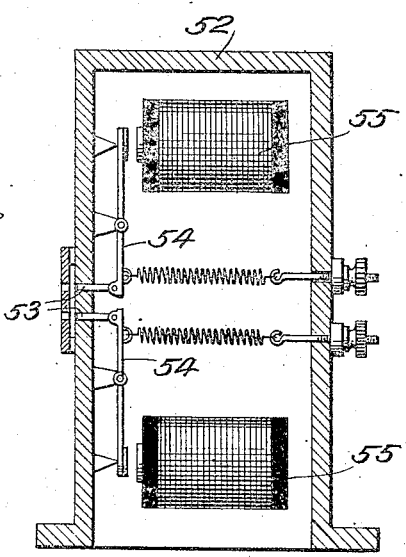
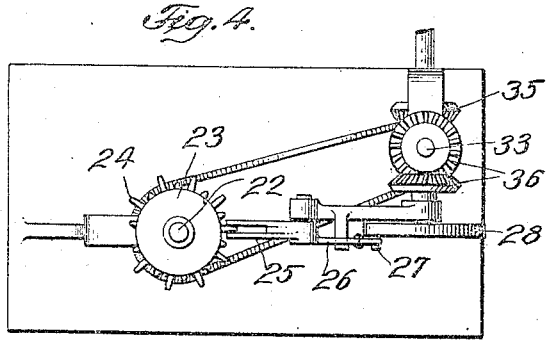
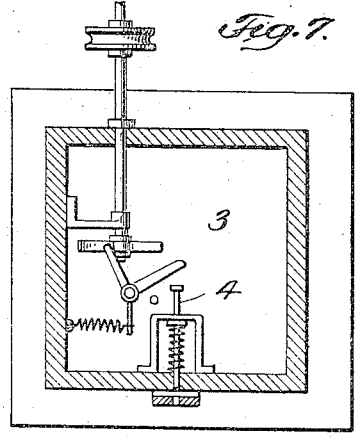
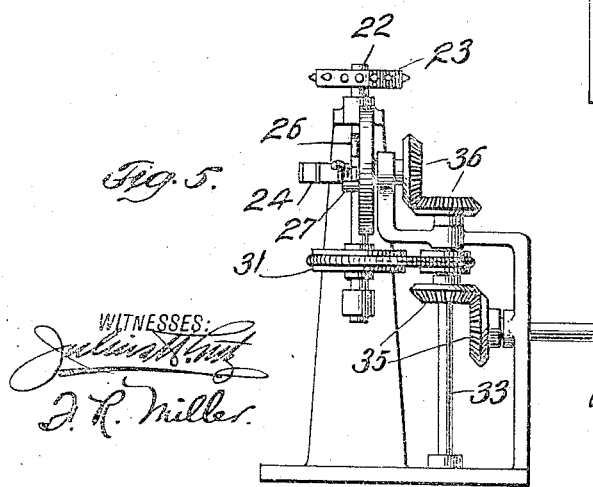

J. P. O'DONOHUE.
TELEGRAPHIC TAPE PERFORATING APPARATUS.
APPLICATION FILED DEC. 4, 1911.
1,050,163.
Patented Jan. 14, 1913.
3 SHEETS—SHEET 3.
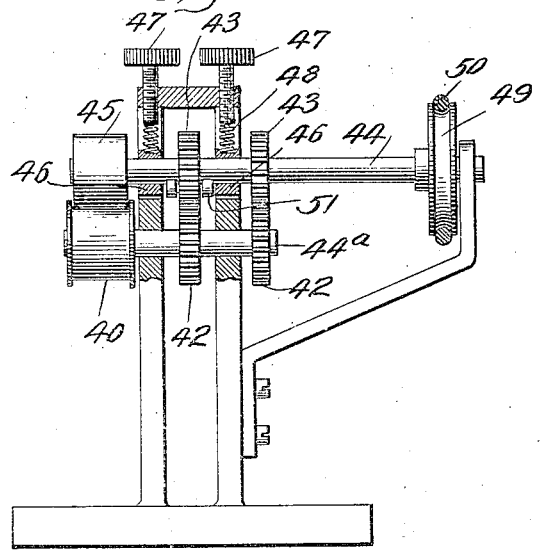
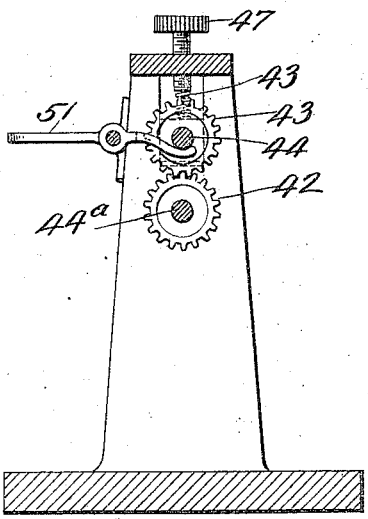
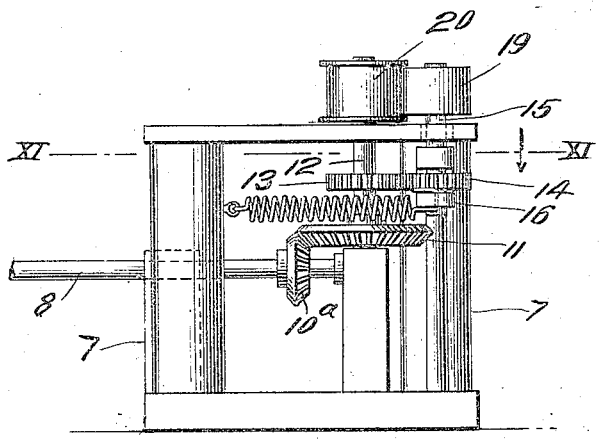
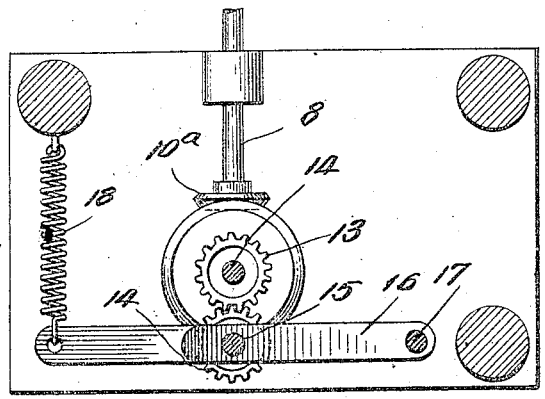
INVENTOR
James P. O'Donohue
BY Davis & Davis
his ATTORNEYS

UNITED STATES PATENT OFFICE.

JAMES PATRICK O'DONOHUE, OF EAST ORANGE, NEW JERSEY.

TELEGRAPHIC-TAPE-PERFORATING APPARATUS.

1,050,163.  Specification of Letters Patent. Patented Jan. 14, 1913.

Application filed December 4, 1911. Serial No. 663,862.

*To all whom it may concern:*

Be it known that I, JAMES PATRICK O'DONOHUE, a citizen of the United States, and resident of East Orange, county of Essex, and State of New Jersey, have invented certain new and useful Improvements in Telegraphic-Tape-Perforating Apparatus, of which the following is a specification.

One of the main objects of this invention is to provide a tape feeding apparatus by means of which the paper tape to be perforated at the receiving end of the line will be so fed to the punches that it will be held stationary while the punches are in engagement therewith but will be moved very rapidly when the punches are disengaged therefrom. During the interval in which the punches are withdrawn from the tape said tape will be fed a distance equal to the distance between two adjoining feed-holes, that is to say, a space equal to one time unit of the tape.

Another object of the invention is to provide a feed-hole punch to form a center line of feed perforations; and also to provide in connection therewith, means for feeding said tape to the electrically actuated punches which form the signal perforations, the feed perforations and the signal perforations being properly spaced and arranged with respect to each other to constitute a transmitting tape.

Another object of the invention is to provide a let-off means to control the feeding of the tape to the punches for forming the signal perforations, said means permitting an extremely rapid step-by-step movement, the steps corresponding to the spaces between the feed perforations. This let-off mechanism holds the strip during the interval in which the signal perforation punches are driven through the paper and withdrawn.

Another object of the invention is to provide a take-up mechanism by means of which the slack in the perforated tape will be taken up instantly when the punches for the signal perforations are withdrawn from it.

Other important objects and advantages of the invention will appear hereinafter.

In the drawings, Figure 1 is a side elevation of the apparatus for producing a perforated tape; Fig. 2 a plan view thereof; Fig. 3 a side elevation of the means for giving the tape a step-by-step or intermittent movement; Fig. 4 a plan view of the mechanism shown in Fig. 3; Fig. 5 a front view of the mechanism shown in Fig. 3; Fig. 6 a detail sectional view of the electrical punches for forming the signal perforations in the tape; Fig. 7 a similar view of the mechanically operated punch for forming the center line of feed perforations; Fig. 8 a vertical sectional view of the means for taking up the slack in the tape after the operation of the signal perforation punches; Fig. 9 a transverse vertical sectional view of the apparatus shown in Fig. 8; Fig. 10 a detail side elevation of the means for drawing the tape from the mechanically operated feed-hole punch and delivering it to the intermittent feeding device; and Fig. 11 a horizontal sectional view on the line XI—XI of Fig. 10.

The paper tape 1 is fed by the positively operated feed rolls 2, to a continuously operating feed hole punch 3. This feed hole punch is mechanically operated and may be driven in any suitable manner. It is provided with a single punch bar 4, and is designed to punch a single central line of feed perforations 5. The speed of this punch and the speed of the feed means is preferably such that the feed hole perforations will be formed one-tenth of an inch apart, along the longitudinal center line of the tape. This is the standard for transmitting tapes, particularly for transmitting tapes using the Wheatstone system. The tape is drawn from the center line or feed punch 3 by means of a feed device 6. This tape feed device is provided with a pair of feed rollers which frictionally and yieldably engage the tape so that said rollers may slip on the tape when it is engaged by the feed hole punch bar, and during the interval in which the said punch is being forced through and withdrawn from the tape. This feed device consists of a supporting frame 7 which may be of any suitable form and in which is mounted a drive shaft 8 carrying a driving pulley 9 over which a drive belt 10 is passed, said belt being driven from a motor shaft or from any other suitable source of power. This shaft carries a beveled gear 10ª which meshes with a similar gear 11 on a vertical shaft 12, said shaft carrying a gear 13. Meshing with the gear 13 is a similar gear 14 mounted upon a vertical shaft 15. This shaft is journaled in a horizontally vibrating arm 16 which is pivoted at one end, at 17, a spring 18 being connected to the other end of said arm and the frame, said spring exerting a suitable pressure to maintain the gears 13 and 14 yieldingly in mesh with each other.

The upper end of the shaft 15 projects above the main frame and carries a feed roller 19 which yieldingly bears against a companion feed roller 20, carried by the shaft 12, this latter roller being provided with flanges between which the tape lies. The tape 1 passes from the feed-hole punch to the feed rolls 19 and 20 and is by said rolls drawn from said punch. The feed rolls 19 and 20 are continuously operated but because of its yieldable mounting the roll 19 will slip on the tape during the interval when the said tape is held stationary by the feed-hole punch bar, all danger of tearing or disrupting the paper being thereby avoided. Any means may be provided for adjusting the tension of the spring 18, if that be found necessary. The speed of the rolls 19 and 20 is considerably higher than the speed of the feed rolls 2. This is necessarily so for the reason that they must take up the slack between the punch bar and the said feed rolls 2 the instant the punch is withdrawn from the tape. The period during which the feed rolls 19 and 20 are moving the tape is reduced by the time interval during which the punch bar 4 engages the paper tape, and this loss must be made up by increasing the speed of said rolls over the speed of the feed rolls 2.

From the frictional feed rolls 19 and 20 the tape passes to a positively operating intermittent feed or let-off device 21 by means of which the tape is fed to the signal punches. This let-off or intermittent feed device consists of a vertical shaft 22 carrying a star wheel 23 at its upper end arranged to engage the feed holes in the tape. Said shaft carries a toothed escapement wheel 24 which is adapted to be engaged by an escapement 25 so that said wheel will be permitted to advance one tooth at a time, thereby permitting the star wheel to feed the tape intermittently the distance between two adjoining feed holes. The escapement is formed with an arm 26 adapted to be engaged by a pin 27 in a rotatable disk 28, said escapement in its normal position holding the escapement wheel against rotation. On the shaft of the star feed wheel is secured a pulley 31 driven by a belt 32 from a vertical shaft 33. This shaft 33 is driven by a pair of beveled gears 35 suitably operated from the motor, and on the upper end of said shaft 33 is a beveled gear 36 meshing with a similar gear on the shaft 37 of the disk 28. It is manifest that as the said disk rotates its pin 27 will engage the arm of the escapement and permit the escapement to advance one tooth at each revolution of the said disk. The belt 32 is arranged to slip on pulley 31 during the period when the escapement wheel is held against movement. The speed of the star wheel is such that the tape will be fed the distance between two of the feed holes during the interval when the signal punches are disengaged from the tape so that the said tape will be advanced from the signal punch device the proper distance the instant the signal punch bars are disengaged therefrom. To accurately guide the tape from the signal punch device a star wheel 38 is mounted just beyond the signal punch, said wheel serving to accurately guide the tape to the punches. The distance between the feed wheel 23 and the idle star wheel 38 is such that when the tape is at rest a feed hole will be vertically in line between the two signal punches and the signal perforations will be properly arranged with respect to said feed perforations. The speed of the tape through the signal punch device is preferably identical with the speed of the transmitting tape at the distant end of the line, so that the time unit between the signal perforation will be precisely the same in the transmitting and the receiving tapes. The signal punch device 52 may be of any suitable construction. As shown in Fig. 6 the punch bars 53 are carried by armatures 54 which are actuated through magnets 55. These magnets are energized by the impulses of current sent over the line from the transmitting station.

To withdraw the operating tape from the signal punch device I provide a take-up mechanism 39 which consists of yieldably mounted feed rolls driven at a very high speed so that the amount of tape fed by the intermittent let-off star wheel will be immediately taken up and advanced through the signal perforating device the instant the signal punch bars are withdrawn from the tape. This take-up device consists of a roll 40 mounted on a shaft 44$^a$, said shaft carrying a pair of gears 42. Meshing with these gears are two similar gears 43 mounted upon a vertically yieldable shaft 44. This shaft carries a feed roll 45 and is journaled in vertically moved boxes 46, adjusting screws 47 and springs 48 being employed to yieldably force the feed roll carried by said shaft against its companion feed roll. This shaft 44 is driven through a pulley 49 by a belt 50 from the motor or any other source of power. The belt is preferably designed to slip on its driving pulley, or on the driven pulley, whenever the tape between the take-up rolls and the signal punches is held stationary by the punches during the punch operation. The moment the signal punches are withdrawn from the tape, however, the take-up rolls operating at a high speed, take up the amount of tape fed by the intermittent let-off star wheel so that the tape might be said to be snapped up the moment it is released by the punches.

To release the tape from the take-up rolls a vibrating lever 51 is provided, said lever engaging under the shaft 44 and serving to raise the same and thereby separate the take-up rolls. These take-up rolls are preferably operated to make at least three revolutions to one revolution of the feed rolls 19 and 20 so that whatever slack may accumulate between the star let-off wheel and the punches will be instantly taken up when the tape is released from the signal punches. As the signal punches will operate upon a constant time unit, it is preferred to synchronize the operation of the let-off star wheel with said punches and by that means synchronize the movement of the tape at the receiving end with the movement of the transmitting tape at the distant end.

It is manifest that with an apparatus such as described herein, a tape will be produced at the receiving end of a line identical in all respects with the transmitting tape and which by reason of the center line of feed perforations, may be used again as a transmitting tape.

I preferably employ belts formed of coil springs so that said springs may readily yield longitudinally and thereby prevent sudden shocks and strain on the paper tape by reason of the sudden starting and stopping of the paper. The spring belts will readily slip over their engaged pulleys when a slight retarding pressure is exerted on the feed rolls. This also assists materially in avoiding disrupting the paper tape. It must be kept in mind, however, that the friction between the feed rolls and the paper tape is sufficient under all normal conditions for rapidly feeding the paper through the punching mechanism without slip.

I preferably operate the strip feed rolls 2 which take the tape from the feed-hole punching device, at such a speed, at the beginning of operations, as to accumulate a slight slack in the tape between the constantly operating feed rolls 19 and 20 and the intermittent star feed wheel 23, so that there will always be sufficient free tape for the star wheel to take up at each of its movements, the star wheel being thereby relieved of the strain of drawing the paper from between the feed rolls 19 and 20.

Having thus fully described my invention, what I claim as new and desire to secure by Letters Patent, is:

1. A telegraphic tape punching apparatus adapted to punch signal perforations on opposite sides of a center line of feed holes in said tape and comprising a pair of punches, means for operating said punches to form signal perforations on opposite sides of a center line of feed holes, a step-by-step feeding means adapted to engage the center line of feed holes and to thereby feed the tape to the signal perforation forming punches, a rotatable yieldable take-up device arranged to draw the paper tape from the signal perforation forming punches, said yieldable take-up device operating constantly and at a greater speed than the step-by-step feeding means, whereby the slack in the tape between the signal perforation forming punches and the step-by-step feed device will be taken up when the tape is free of the signal punches.

2. A telegraphic tape punching apparatus adapted to punch signal perforations on opposite sides of a center line of feed holes in said tape and comprising a pair of punches, means for operating said punches to form signal perforations on opposite sides of a center line of feed holes, a step-by-step feeding means adapted to engage the center line of feed holes in the tape to feed the tape to the signal perforation forming punches, means to permit said step-by-step feeding means to advance the tape one step after each operation of either signal punch, and a constantly operating yieldable take-up device operating at a greater speed than the feed device and drawing the tape from the signal punches and taking up any slack between said punches and the feed device.

3. A telegraphic tape punching apparatus adapted to punch signal perforations in said tape and comprising a pair of punches, means for operating said punches to form signal perforations, a feeding means adapted to feed said tape to said punches while the punches are engaged therein, whereby said tape will be slack between said feeding means and said punches during the punching operation, a rotatable yieldable take-up device arranged to draw the paper from the signal perforation forming punches, said yieldable take-up device operating constantly and at a greater speed than the feeding means whereby the slack in the tape between the signal perforation forming punches and the feed device will be quickly snapped up when the tape is free of the signal punches.

In testimony whereof I hereunto affix my signature in the presence of two witnesses.

JAMES PATRICK O'DONOHUE.

Witnesses:
  WM. R. DAVIS,
  F. R. MILLER.